(12) United States Patent
Kim et al.

(10) Patent No.: US 8,270,354 B2
(45) Date of Patent: Sep. 18, 2012

(54) METHOD FOR TRANSMITTING UP LINK CONTROL SIGNAL IN MOBILE COMMUNICATION SYSTEM

(75) Inventors: Jae-Heung Kim, Daejon (KR); Young-Jo Ko, Daejon (KR); Kyoung-Seok Lee, Daejon (KR); Jung-Im Kim, Daejon (KR); Soo-Jung Jung, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 646 days.

(21) Appl. No.: 12/299,074

(22) PCT Filed: May 3, 2007

(86) PCT No.: PCT/KR2007/002179
§ 371 (c)(1),
(2), (4) Date: Oct. 30, 2008

(87) PCT Pub. No.: WO2007/126302
PCT Pub. Date: Nov. 8, 2007

(65) Prior Publication Data
US 2009/0129330 A1 May 21, 2009

(30) Foreign Application Priority Data

May 3, 2006 (KR) .......................... 10-2006-0040130
Feb. 28, 2007 (KR) .......................... 10-2007-0020162

(51) Int. Cl.
*H04W 4/00* (2009.01)
*H04J 1/00* (2006.01)
(52) U.S. Cl. ........................................ 370/329; 370/343
(58) Field of Classification Search .................. None
See application file for complete search history.

(56) References Cited

U.S. PATENT DOCUMENTS

| 7,643,454 | B2 * | 1/2010 | Guethaus et al. | 370/335 |
|---|---|---|---|---|
| 2002/0181422 | A1 | 12/2002 | Parantainen et al. | |
| 2005/0135416 | A1 * | 6/2005 | Ketchum et al. | 370/469 |
| 2007/0258540 | A1 * | 11/2007 | Ratasuk et al. | 375/267 |
| 2010/0182964 | A1 * | 7/2010 | Ojala et al. | 370/329 |

FOREIGN PATENT DOCUMENTS

| KR | 10-2002-0067245 | | 8/2002 |
|---|---|---|---|
| KR | 10-2003-0029310 | | 4/2003 |
| WO | WO 2005/057822 | * | 6/2005 |

OTHER PUBLICATIONS

International Search Report, Application No. PCT/KR2007/002179, Dated Aug. 21, 2007.
Samsung, "Downlink Control Signaling", 3GPP RAN WG1 #44bis, R1-060811, Mar. 27-31, 2006, pp. 1-4.

* cited by examiner

*Primary Examiner* — Nittaya Juntima
(74) *Attorney, Agent, or Firm* — Fenwick & West LLP

(57) ABSTRACT

The present invention relates to a method for transmitting uplink control information in a mobile communication system; and, more particularly, to a method for effectively forming uplink control information transmitted through a downlink from a base station to a terminal in a mobile communication system for providing a packet service and transmitting the uplink control information with minimum radio resources occupied. The method includes the steps of generating uplink control information; allocating the uplink control information to a downlink-shared radio resource for packet data transmission based on downlink scheduling information; and transmitting the radio resource to a terminal. The present invention is applied to a mobile communication system.

18 Claims, 4 Drawing Sheets

US 8,270,354 B2

METHOD FOR TRANSMITTING UP LINK CONTROL SIGNAL IN MOBILE COMMUNICATION SYSTEM

TECHNICAL FIELD

The present invention relates to a method for transmitting uplink control information in a mobile communication system; and, more particularly, to a method for effectively forming uplink control information transmitted through a downlink from a base station to a user terminal in mobile communication systems for providing a packet service and transmitting the uplink control information with minimum radio resources occupied.

BACKGROUND ART

A conventional mobile communication system is a circuit based system that enables a base station to transmit a control signal to a user terminal using a downlink-dedicated channel. However, it is difficult to apply a conventional method for transmitting a control signal using the dedicated channel to a long term evolution (LTE) system that is a packet based system introduced for providing various packet services. Currently, the related standardization processes of the LTE system have been in progress.

Unlike the circuit based system that fixedly allocates radio resources to a terminal, a plurality of terminals share radio resources for transmitting packet service data in mobile communication systems for providing a packet service. Accordingly, the packet based mobile communication system needs a method for providing uplink control information to a plurality of terminals in order to enable each of the terminals to distinguish allocated radio resources from the other and to access the allocated radio resources at a scheduling time. Also, a long term evolution (LTE) system for providing a pure packet service requires a method for forming uplink control information to variably and flexibly use the radio resources of a physical layer and a method for transmitting the uplink control information.

To fulfill such requirements, there have been many researches for developing a method for dividing radio resources into local allocated radio resource and distributed allocated radio resource in order to allocate and manage radio resources adaptively to a wireless environment. In order to effectively allocate the two types of radio resources, there have been also many researches in progress for developing a method for transmitting control information through a control channel shared by a plurality of terminals rather than a Wideband Code Division Multiple Access (WCDMA) scheme and transmitting the predetermined part of the control information through radio resources allocated to each of terminals.

That is, there is a demand for developing a method for effectively forming uplink control information using a downlink from a base station to a terminal and transmitting the uplink control information with minimum radio resource occupied in packet based mobile communication systems developed based on a $3^{rd}$ generation partnership project (3GPP) system so as to improve the utilization of limited radio resources.

DISCLOSURE

Technical Problem

An embodiment of the present invention is directed to providing a method for effectively forming uplink control information transmitted through a downlink from a base station to a terminal in a mobile communication station for providing a packet service and for transmitting the uplink control information with minimum radio resources occupied.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for transmitting uplink control information in a mobile communication system, which includes the steps of: a) generating uplink control information; b) allocating the uplink control information to downlink-shared radio resources for packet data transmission based on downlink scheduling information; and c) transmitting the radio resource to a terminal.

ADVANTAGEOUS EFFECTS

According to an embodiment of the present invention, the utilization of limited radio resources can be maximized by efficiently forming uplink control information to be transmitted through a downlink from a base station to a terminal in a packet based mobile communication system and transmitting the uplink control information with minimum radio resources occupied.

BEST MODE FOR THE INVENTION

The advantages, features and aspects of the invention will become apparent from the following description of the embodiments with reference to the accompanying drawings, which is set forth hereinafter.

Figure 1:
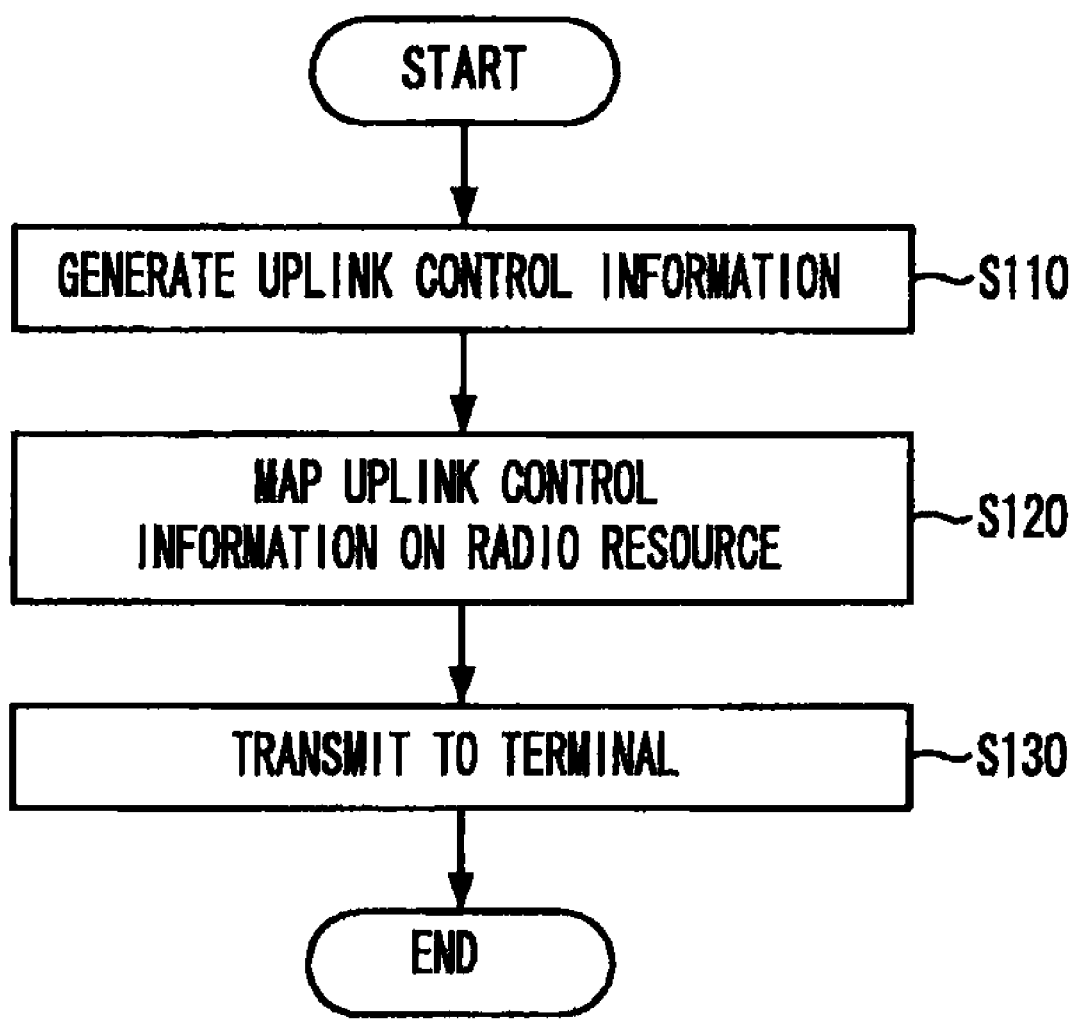
FIG. 1 is a flowchart illustrating a method for transmitting uplink control information in a mobile communication system in accordance with an embodiment of the present invention.

FIG. 1 is a flowchart illustrating a method for transmitting uplink control information in a mobile communication system in accordance with an embodiment of the present invention.

At first, a base station generates uplink control information to transmit to a terminal at step S110.

The uplink control information may include at least one among uplink scheduling information, random access response information, and response information for sustaining the uplink synchronization of a physical layer, which are required in a system based on Orthogonal Frequency Division Multiple Access (OFDMA) or Single Carrier—Frequency Division Multiple Access (SC-FDMA) technology. For example, the uplink control information may include both of uplink scheduling information and uplink random access response information or one of the uplink scheduling information and the uplink random access response information.

The uplink scheduling information may include radio resource allocation information, modulation/encoding information, and retransmission information.

The radio resource allocation information may include a scheduling identifier, an uplink radio resource block location, and an allocation period. The scheduling identifier is information about a terminal or a terminal group where allocated radio resource belongs to. The uplink radio resource block location is information for addressing the radio resources of an OFDMA system, which are distinguished by frequency and time domains. The allocation period is information about a period when the allocated radio resource is valid.

The modulation/encoding information may include information about a transport format and a multi input multi output (MIMO). The transport format may include a modulation scheme applied to an allocated radio resource among modulation schemes, e.g., Quadrature Phase Shift Keying (QPSK), 16-Quadrature Amplitude Modulation (16QAM), and 64-Quadrature Amplitude Modulation (64QAM), and a payload size or an encoding level. That is, the transport formation is information for calculating an encoding level by informing of a size of a payload to transmit through the allocated radio resource or to directly inform of the encoding level. The MIMO related information is control information necessary to improve the system performance by transmitting and receiving data through multiple antennas.

The retransmission information is information related to retransmit packet data which is transmitting through the allocated radio resource.

The random access response information may include radio resource allocation information, timing alignment information (TA), and power level information. The random access response information may further include frequency advanced information (FA).

The radio resource allocation information includes information about a terminal identifier and an uplink radio resource block location. The terminal identifier is information about a terminal or a terminal group where a random access response message belongs to. As the terminal identifier, a signature index used for random access or a random access (RA) preamble sequence index used for random access is used. Also, an additional identifier, for example, a random identity can be used. The uplink radio resource block location is information for addressing an uplink radio resource available to a terminal that tries random access.

The timing alignment information is timing adjustment information for a terminal to synchronize the uplink of a physical layer and for reducing a timing error estimated by a base station using a signal sequence pattern transmitted by a terminal to sustain the uplink synchronization, for example, a signature and a predetermined symbol pattern, which are transmitted when an initial random access is tried.

The power level information is information about a power reference level for setting a power level to transmit data from a terminal through an uplink power level measured by a base station using a signal sequence pattern transmitted from a terminal to sustain the uplink synchronization, for example, a signature and a predetermined symbol pattern, which are transmitted when an initial random access is tried.

The response information for sustaining the uplink synchronization of the physical layer may include timing alignment information, frequency adjustment information, and power level information.

The frequency adjustment information is information for a terminal to synchronize the uplink of a physical layer and for reducing a frequency error estimated by a base station using a signal sequence pattern transmitted by a terminal to sustain the uplink synchronization, for example, a signature and a predetermined symbol pattern, which are transmitted when an initial random access is tried.

After the step S110, a base station allocates the uplink control information to downlink-shared radio resources for transmitting packet data at step S120.

The present invention can be applied to an Orthogonal Frequency Division Multiple (OFDM) group system such as an Orthogonal Frequency Division Multiple Access (OFDMA) or Single Carrier—Frequency Division Multiple Access (SC-FDMA). Unlike the Code Division Multiple Access (CDMA) system that identifies a radio resource exclusively allocated to each terminal by allocating codes, the OFDM group system enables terminals to two dimensionally share radio resources that are identified in a frequency domain and a time domain. That is, a downlink physical channel and an uplink physical channel transmits radio resources formed of a time and a frequency after dividing the radio resources, and the radio resources use a radio resource block divided into a transmitting period TTI (Transmission Time Interval) and a sub carrier group as a sub carrier index.

As a method for allocating uplink control information to a downlink-shared radio resource block, a method for variably allocating radio resources using downlink scheduling information and a method for fixedly allocating a part of radio resources are introduced.

The embodiments of the method for adaptively allocating radio resources using downlink scheduling information and the method for constantly allocating a part of radio resources will be described with reference to related drawings in later.

After the step S120, a base station transmits a downlink radio resource with allocated uplink control information to a terminal at step S130.

The uplink control information transmitted through the downlink is transmitted through encoding processes to sustain a predetermined quality in a wireless channel. For this, the uplink control information is transmitted after jointly coding the uplink control information for a plurality of terminals or separately coding of the uplink control information of each terminal.

Terminals in a MAC_Active state for transmitting data can transmit packet data using a radio resource allocated through the uplink scheduling information.

That is, a terminal confirms a relation of radio resources and terminal scheduling identifiers by searching uplink scheduling information transmitted to a downlink at every TTI, checks a corresponding radio resource location and a radio resource allocation period when the terminal scheduling identifier of a corresponding terminal or the terminal scheduling identifier of a corresponding group is included therein, and transmits packet data using the radio resources allocated to the corresponding terminal after coding and modulating. Also, the terminal performs a HARQ operation using the retransmission information of the uplink control information.

That is, according to the method for using downlink scheduling information to transmit the uplink scheduling information and/or random access response information, a part of a terminal scheduling identifier is reserved and allocated as a group identifier, and the transmission of response information for uplink scheduling information and/or random access response information is addressed using the group identifier.

Therefore, the terminals can confirm the group identifier to inform of the transmission for the uplink scheduling information and/or random access response information by searching downlink scheduling information. After confirming the group identifier, each of the terminals can obtain the uplink scheduling information and/or random access response information transmitted from a base station through demodulation and decoding the data transmitted on the shared radio resource of an allocated radio resource location having corresponding group scheduling information.

Figure 2:
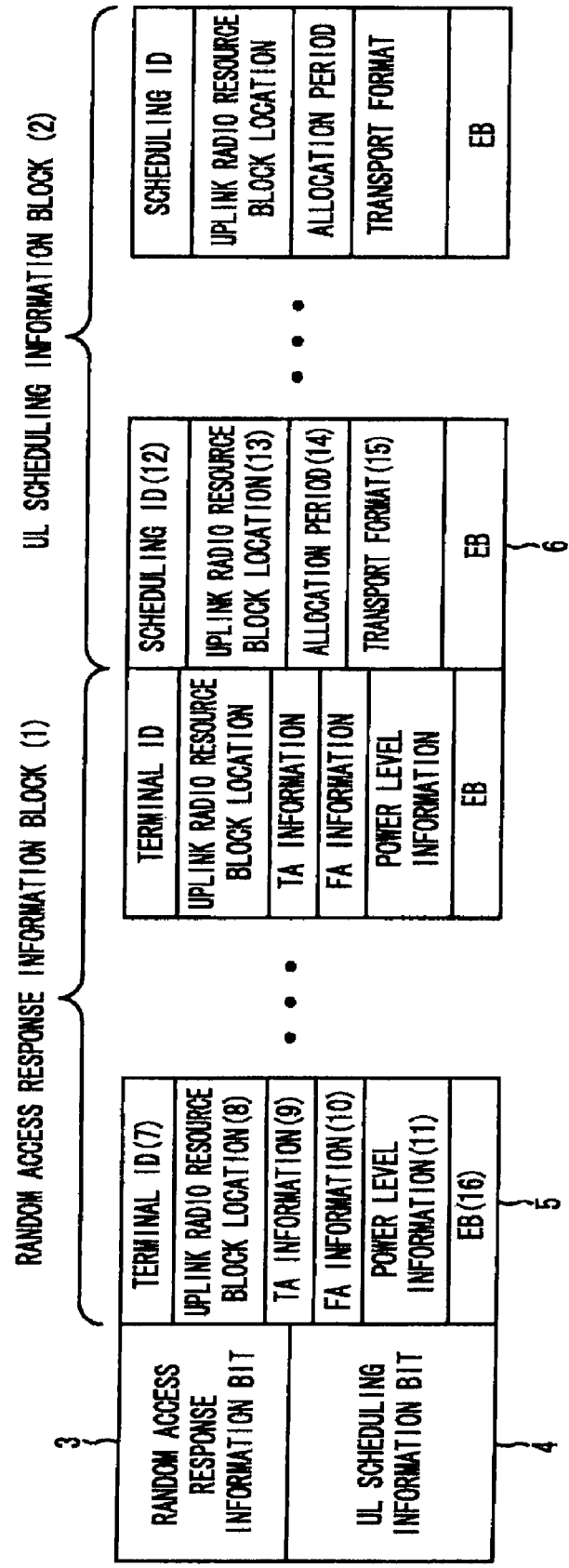
FIG. 2 is a block diagram depicting uplink control information in accordance with an embodiment of the present invention.

FIG. 2 is a diagram illustrating uplink control information for transmitting uplink scheduling information and random access response information using radio resources allocated as downlink scheduling information using a group identifier in accordance with an embodiment of the present invention.

As shown in FIG. 2, the uplink control information includes a random access response information block 1 formed in a unit of information element IE, uplink scheduling information (UL scheduling information) block 2, a random access response information bit 3 for informing of the existence of the random access response information, and an UL random access information bit 4 for informing of the existence of the UL scheduling information.

If the random access response information bit 3 and the UL scheduling information bit 4 are 1, the random access response information bit 3 and the UL scheduling information bit 4 denote that the corresponding information is included therein. On the contrary, if the random access response information bit 3 and the UL scheduling information bit 4 are 0, the random access response information bit 3 and the UL scheduling information bit 4 denote that the corresponding information is not included.

If the random access response information bit 3 is 1, a terminal trying random access searches the random access response information IE 5.

As a terminal identifier 7 of the random access response information IE, a signature index used for random access or a sequence identifier of a preamble used for random access is used.

If a terminal identifier 7 in the random access response information IE is matched with the own identifier such as a signature or a sequence index of a preamble transmitted from oneself, a terminal transmits the own information on the uplink using the uplink radio resource block location 8 information in the IE.

Herein, the timing synchronization of an uplink is adjusted using the TA information 9 in the random access response information IE. If it is necessary, a power level and a frequency can be properly set when data is transmitted through the uplink by including the FA information 10 and the power level information 11 in the random access response information IE in order to properly transmit data through the uplink.

Also, an extension bit EB 16 is used for denoting whether or not another information IE is included after each information IE in a random access response information block or an UL scheduling information block. If another information IE is included, the EB is set to 0. If another information IE is not included, the EB is set to 1.

Also, if the random access response information bit is set to 1, that is, if the random access response information IE is included, terminals in a MAC_Active state for transmitting or receiving data to/from a base station can access UL scheduling information by confirming the EB. On the contrary, if the random access response information is set to 0, that is, if the UL scheduling information is not included, terminals directly search the UL scheduling information IE 6.

If a scheduling identifier 12 is matched with an own scheduling identifier for scheduling after terminals searches UL scheduling information IE, the terminals determine corresponding UL scheduling information IE as UL scheduling control information for radio resources allocated to oneself. Then, the terminals check the uplink radio resource block location 13, the allocation period 14, and the transport format 15, and transmit data to an uplink according to the scheduling information.

Each terminal checks an extension bit EB 15 in each information IE if a terminal identifier in random access response information IE or a scheduling identifier of an UL scheduling information IE is not an own terminal identifier or an own scheduling identifier.

Although the uplink control information includes the uplink scheduling information and the random access response information together in the present embodiment, the uplink control information may include one of the uplink scheduling information and the random access response information as described above.

If a system transmits only random access response information independently, the random access response information bit 3 and the UL scheduling information bit 4 are not necessary. Random access response information is independently transmitted by forming a random access response information block 1 for the random access response information using downlink radio resources addressed with a group identifier for transmitting a random access response message.

Also, if uplink scheduling information is independently transmitted, only the uplink scheduling information is transmitted with the same method because the random access response information bit 3 and the UL scheduling information bit 4 are not necessary.

The random access response information and/or the uplink scheduling information can be transmitted to one or multiple terminals using the shared radio resources assigned by downlink scheduling information as described above.

Figure 3:
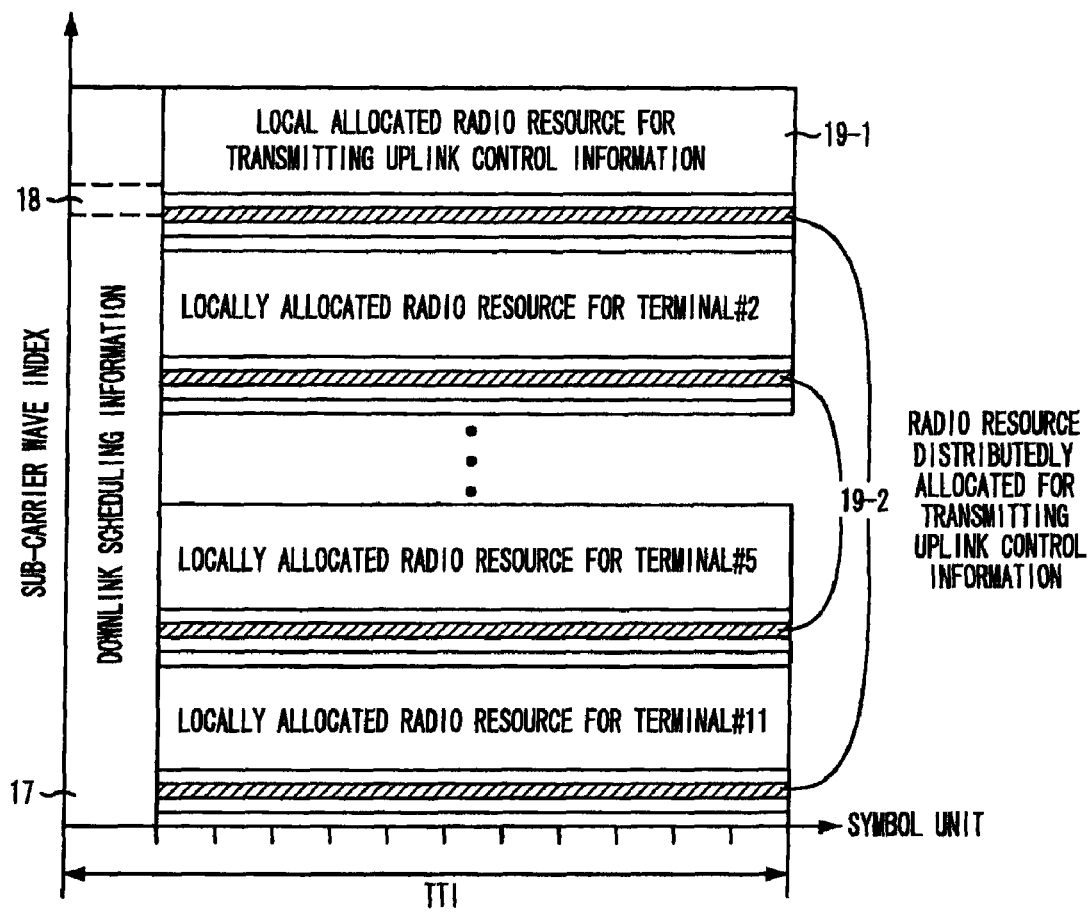
FIG. 3 is a diagram showing a radio resource block with uplink control information allocated using downlink scheduling information in accordance with an embodiment of the present invention.
Figure 4:
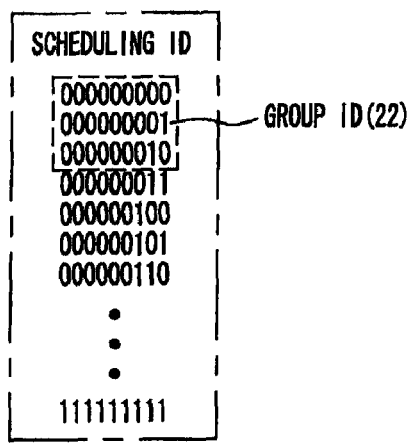
FIG. 4 is a diagram illustrating a group identifier of downlink scheduling information in accordance with an embodiment of the present invention.

FIG. 3 is a diagram illustrating a radio resources block allocated with uplink control information using downlink scheduling information in accordance with an embodiment of the present invention, and FIG. 4 is a diagram illustrating a group identifier of downlink scheduling information.

As shown in FIG. 3, the uplink control information is local allocation 19-1 or distributed allocation 19-2 according to the amount of uplink control information using DL scheduling information 18 of a certain terminal group, which is a part IE of downlink scheduling information.

The DL scheduling information 18 of the certain terminal group includes a scheduling identifier, allocated radio resource block location information, and an error correction code CRC.

The scheduling identifier, as shown in FIG. 4, includes a group identifier 22 denoting a terminal that receives uplink control information or a terminal group. That is, a predetermined part of a scheduling identifier can be used as a group identifier 22.

The allocated radio resource block location information denotes the location of uplink link control information allocated on the shared radio resource.

Terminals can check a group identifier and allocated the shared radio resource block location information for transmitting uplink control information by searching downlink scheduling information, and then they can obtain uplink control information like uplink scheduling information and random access response information by demodulating and decoding data transmitted through the allocated radio resource.

When the uplink scheduling information and the random access response information are transmitted using radio resources allocated using downlink scheduling information, a proper radio resource can be allocated according to whether or not the uplink scheduling information and the random access response information are present or according to the sizes thereof. If necessary, the uplink control information can be transmitted by applying the most robust adaptive modulation and decode method available in the system.

Figure 5:
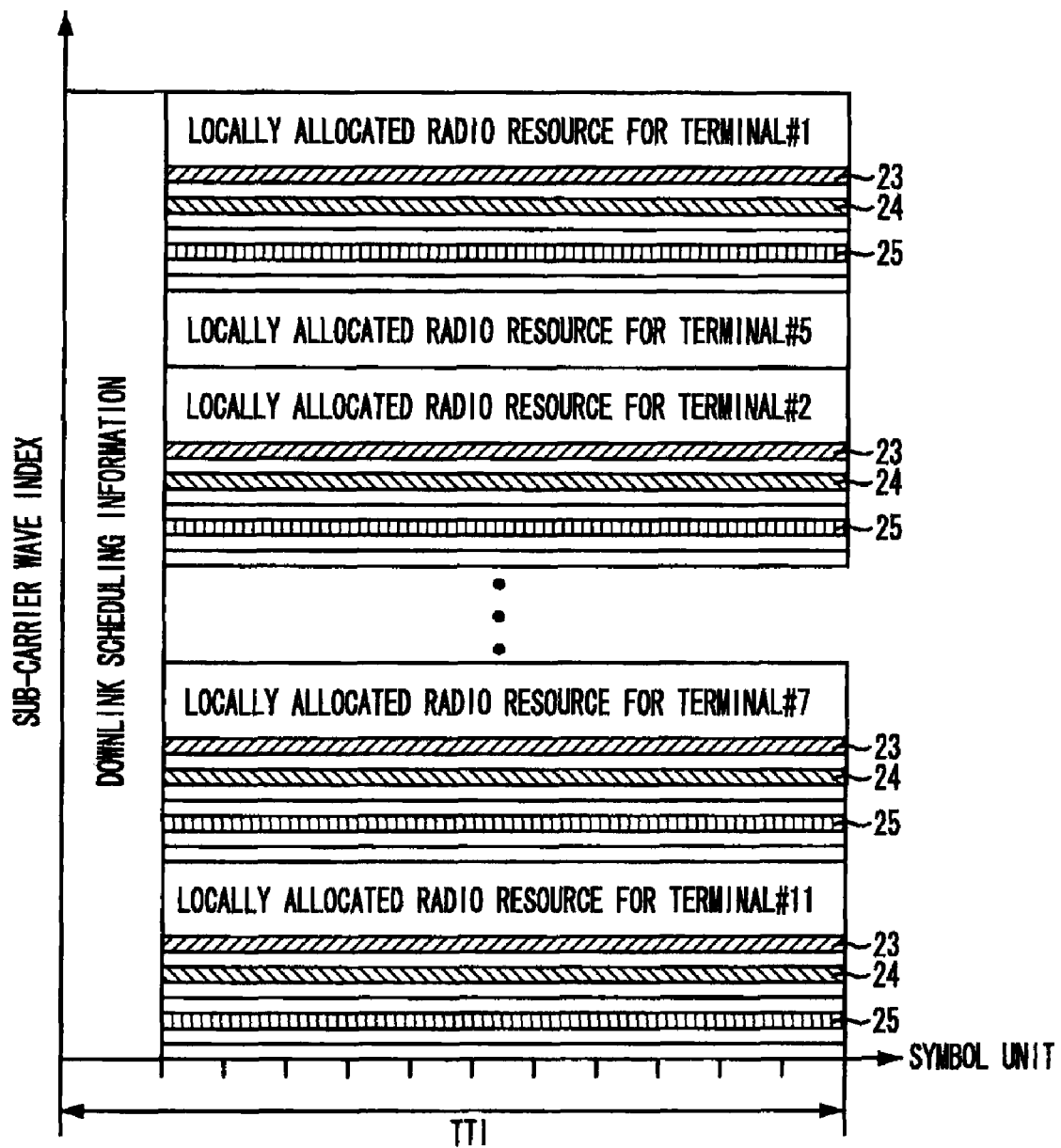
FIG. 5 is a diagram depicting a radio resource block with uplink control information allocated in accordance with an embodiment of the present invention.

FIG. 5 is a diagram illustrating a radio resource block fixedly distribution-allocated with uplink control information in accordance with an embodiment of the present invention.

As shown in FIG. 5, uplink control information such as random access response information 23, uplink scheduling information 24, and response information 25 for sustaining uplink synchronization of a physical layer, fixedly distribution-allocated on the downlink radio resource in the present embodiment.

A base station fixedly allocates a downlink distributed allocation radio resource block by reserving the downlink distributed allocation radio resource block to an assigned location at TTI, and transmits the allocated information to entire base stations through a broadcasting channel (BCH), which is system information.

Since terminals recognize the block of random access response information 23 allocated to a downlink radio resource through a broadcasting channel, uplink scheduling information 24, or response information 25 for sustaining uplink synchronization of a physical layer, the terminals do not need additional control information for addressing a downlink radio resource block where uplink control information is transmitted. Also, if uplink control information to transmit to a downlink is not present at a given TTI, the radio resource block reserved for transmitting uplink control information can be adaptively used for transmitting other information.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the spirits and scope of the invention as defined in the following claims.

What is claimed is:

1. A method for transmitting response for random access in a base station of a mobile communication system, the method comprising:
generating a response for random access received from a terminal;
allocating the response for random access to downlink-shared radio resource for transmitting packet data; and
transmitting to the terminal an identifier indicating transmission of the response for random access through a channel carrying downlink scheduling information, and transmitting to the terminal the response for random access through the downlink-shared radio resource for transmitting packet data, wherein responses for random access for a plurality of terminals are addressed using the identifier.

2. The method as recited in claim 1, wherein the response for random access includes one or more among timing alignment (TA) information, an identifier of a random access preamble used for the random access received from the terminal, information on allocation of radio resource block to be used when uplink transmission is performed and information on power level to be used when uplink transmission is performed.

3. The method as recited in claim 1, wherein the identifier is reserved and allocated among scheduling identifiers used in the mobile communication system.

4. The method as recited in claim 1, wherein the responses for random accesses for the plurality of terminals are transmitted to the plurality of terminals.

5. The method as recited in claim 1, further comprising receiving, from the terminal, uplink transmission using information on allocation of radio resource block to be used when uplink transmission is performed, the information being included in the response for random access.

6. The method as recited in claim 5, wherein the uplink transmission is to transmit information on the terminal.

7. The method as recited in claim 1, wherein the response for random access is dynamically allocated to the downlink-shared radio resource.

8. The method as recited in claim 7, wherein information on allocation of the downlink-shared radio resource is transmitted through the channel carrying downlink scheduling information.

9. The method as recited in claim 1, wherein the response for random access is fixedly allocated to the downlink-shared radio resource.

10. A method for receiving response for random access in a terminal of a mobile communication system, the method comprising:
receiving an identifier indicating transmission of the response for random access, the identifier being transmitted through a channel carrying downlink scheduling information; and
receiving the response for random access which is addressed using the identifier through downlink shared radio resource for transmitting packet data, the identifier being used to address responses for random access for a plurality of terminals.

11. The method as recited in claim 10, wherein the response for random access includes one or more among timing alignment (TA) information, an identifier of a random access preamble used for the random access, information on allocation of radio resource block to be used when uplink transmission is performed and information on power level to be used when uplink transmission is performed.

12. The method as recited in claim 10, wherein the identifier is reserved and allocated among scheduling identifiers used in the mobile communication system.

13. The method as recited in claim 10, wherein the responses for random accesses for the plurality of terminals are transmitted to the plurality of terminals.

14. The method as recited in claim 10, further comprising performing uplink transmission using information on allocation of radio resource block to be used when uplink transmission is performed, the information being included in the response for random access.

15. The method as recited in claim 14, wherein the uplink transmission is to transmit information on the terminal to a base station.

16. The method as recited in claim 10, wherein the response for random access is dynamically allocated to the downlink-shared radio resource.

17. The method as recited in claim 16, wherein information on allocation of the downlink-shared radio resource is received through the channel carrying downlink scheduling information.

18. The method as recited in claim 10, wherein the response for random access is fixedly allocated to the downlink-shared radio resource.

* * * * *